United States Patent
Fiegler

(10) Patent No.: US 7,565,961 B2
(45) Date of Patent: Jul. 28, 2009

(54) PROCESS AND DEVICE FOR THE HANDLING OF OBJECTS

(75) Inventor: Rudolf Fiegler, Regensburg (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 10/544,137

(22) PCT Filed: Nov. 5, 2004

(86) PCT No.: PCT/EP2004/012519

§ 371 (c)(1),
(2), (4) Date: Apr. 4, 2006

(87) PCT Pub. No.: WO2005/058734

PCT Pub. Date: Jun. 30, 2005

(65) Prior Publication Data

US 2006/0207859 A1    Sep. 21, 2006

(30) Foreign Application Priority Data

Nov. 26, 2003   (DE) ............................... 103 55 183

(51) Int. Cl.
*B65G 25/00* (2006.01)
*B65G 47/84* (2006.01)

(52) U.S. Cl. .............. 198/478.1; 198/470.1; 198/471.1; 198/481.1; 198/459.2

(58) Field of Classification Search .............. 198/478.1, 198/470.1, 471.1, 481.1, 459.2
See application file for complete search history.

(56) References Cited

U.S. PATENT DOCUMENTS 3,710,928 A * 1/1973 van Zijp ................. 198/803.9

4,795,519 A * 1/1989 Bullinger et al. ............ 156/363
5,695,041 A * 12/1997 Kouda et al. ............. 198/459.2
6,354,427 B1 * 3/2002 Pickel et al. ............. 198/470.1
6,520,318 B1 * 2/2003 Humele .................... 198/483.1
6,832,679 B2 * 12/2004 Berndtsson .............. 198/471.1

FOREIGN PATENT DOCUMENTS

| DE | 19703528 A1 | 8/1998 |
| EP | 0276216 B1 | 12/1995 |
| EP | 0743267 B1 | 11/1996 |
| EP | 0894544 B1 | 2/1999 |
| EP | 1009710 B1 | 6/2000 |
| FR | 2576003 | 7/1986 |
| FR | 2827044 | 7/2001 |
| WO | WO 01/29528 A2 | 4/2001 |

* cited by examiner

*Primary Examiner*—Gene Crawford
*Assistant Examiner*—Leslie A Nicholson, III
(74) *Attorney, Agent, or Firm*—Marshall, Gerstein & Borun LLP

(57) ABSTRACT

A process and device for the handling of objects, such as containers, particularly bottles, is described, in which an extension of the transport path is possible in a constructionally simple manner and with a compact design. For this purpose, the containers are moved on a rotating conveyor to an intake station, which rotating conveyor first moves them past a discharge station and again to the intake station, and then past an intake station and again to the discharge station, whereby the containers are removed from the rotating conveyor no sooner than upon their second arrival at the discharge station, whereby a multiple through-passage section is formed in the direction of transport between the intake station and the discharge station.

5 Claims, 1 Drawing Sheet

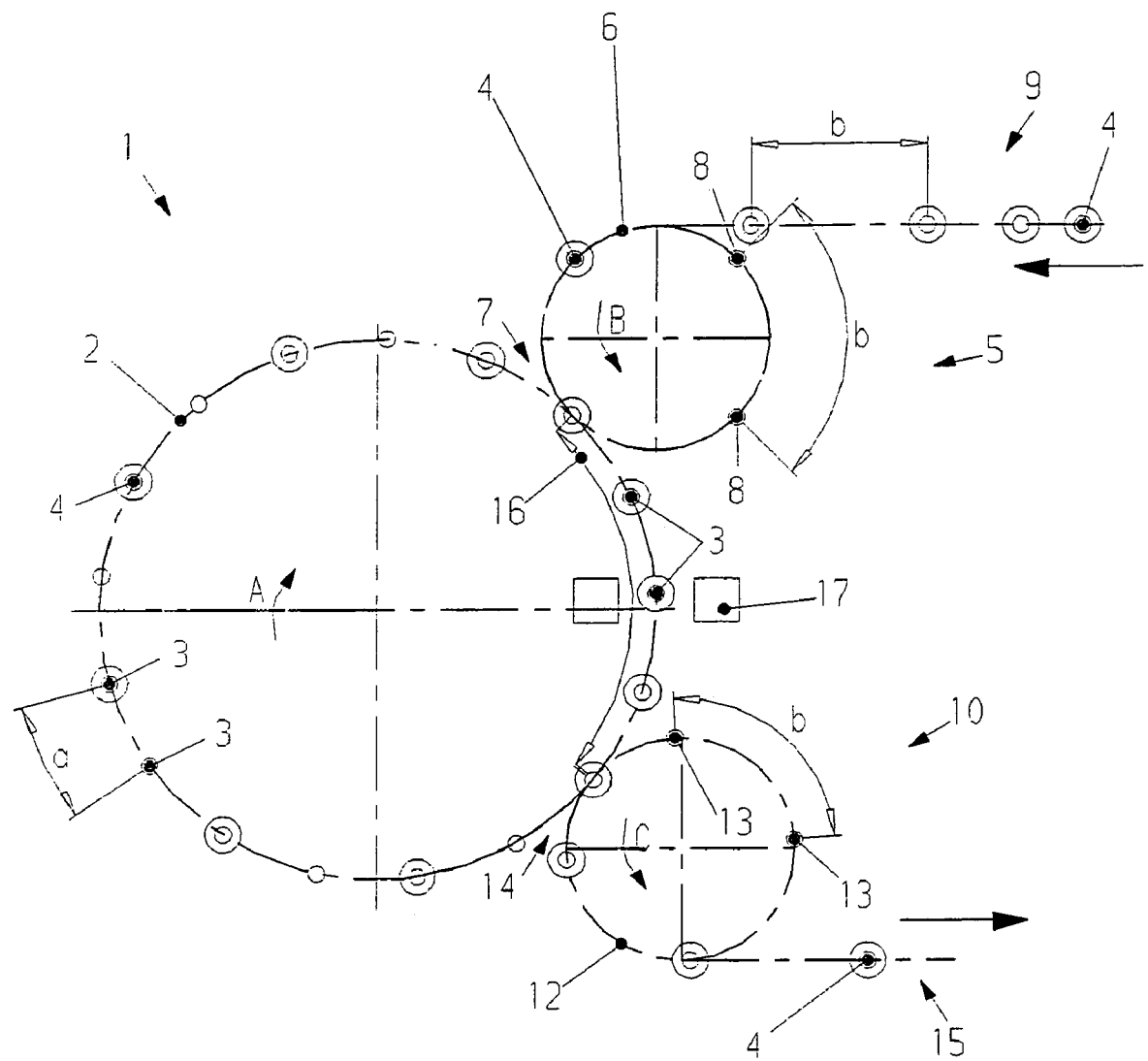

PROCESS AND DEVICE FOR THE HANDLING OF OBJECTS

REFERENCE TO RELATED APPLICATIONS

This is the U.S. national stage, under 35 U.S.C. § 371, of international application No. PCT/EP2004/012519, having an international filing date of Nov. 5, 2004, and claims priority to German application No. 10355183.2, filed Nov. 26, 2003.

FIELD OF THE DISCLOSURE

This disclosure relates to a process and a device for the handling of objects such as containers, particularly bottles.

BACKGROUND OF THE DISCLOSURE

During the handling of containers, particularly of bottles, such as in processing lines in which bottles are filled, sealed, monitored for the level of filling or tightness, as the case may be, or are labeled, for example, situations repeatedly occur in which it is desirable to allow a certain waiting time, either in order to wait for the reduction of an excessive foam formation, or to be able to exert a pressure on the flexible containers between the initial and the final measurement, such as during a tightness test, for example, for long enough for the testing devices to be able to identify a possible lack of tightness, etc. In predominantly automated process lines, however, an orderly transport should be maintained in order to optimize the passage time. On the other hand, the conveying-and processing devices for the containers should be constructed as compactly as possible, in order to save set-up space and construction place, as the case may be.

SUMMARY OF THE DISCLOSURE

The task that forms the basis of the invention is that of making available a process and a device for the handling of containers, particularly of bottles, which makes it possible, in a constructionally simple and compact manner of construction, to allow for the necessary waiting times in the handling of the containers.

By means of the configuration in accordance with the disclosure, a possibility is provided, in a constructionally simple manner, and with a compact, space-saving manner of construction, to allow containers to each pass a certain waiting time between two processing processes.

The configurations disclosed ensure, in a constructionally simple mechanical manner, that the containers pass through the desired section multiple times, whereby both the intake- and the discharge station, as well as the rotating conveyor, can be operated continuously—that is to say, either in a uniformly timed manner or at a constant speed, without expensive controls based upon an identification of every individual container having to be used—are of particular advantage.

The disclosure is, in particular, advantageously usable in cases in which a tightness test for flexible containers, such as in the case of plastic bottles, for example, is to be carried out. For such a tightness test, such as is known from WO01/29528, for example, it is suitable to carry out an initial measurement, to place the container under pressure, and to then carry out a final measurement, whereby both measured values are compared with one another and, in the event of a deviation of the two measured values by a predetermined tolerance value, the container is rejected as untight. In the known measurement, two testing devices and a conveying section positioned between the testing devices, whereby the containers in the conveying section are kept under permanent pressure, are consequently necessary. It is, of course, also possible to identify untight, flexible containers by means of a single measurement, such as in the case of the device in accordance with DE 197 03 528, for example. This publication describes clamping devices, by means of which a predetermined pressure, under which untight containers bulge out in an elliptical manner, is exerted on the containers. This elliptical convexity is preferably determined by means of a light barrier, which must be adjusted in such a manner, however, that its light beam passes by the circumference of the containers precisely outside an accepted convexity of the containers. For this, however, it is necessary to precisely adjust the light barrier to the predetermined form and the predetermined dimensions, which only provides benefits if only containers with one single shape and one single dimensioning are conveyed by means of the device.

By means of the configuration in accordance with the invention, on the other hand, it is possible to carry out at least a two-fold measurement with one single testing device, so that, upon the first measurement, a reference value is obtained with the same testing device, which value corresponds to an accepted value of a specific shape or dimension of a container, for example, and is interpreted as tightness, after which the containers are subjected to an external pressure and the changes from the external pressure are subsequently determined in the second measurement by the same testing device, and it is decided whether the changes, such as deformations, for example, lie within an accepted framework, or whether the bottle must be rejected as untight. Only smaller leaks, which only lead to a detectable container deformation after a longer action of force, can be detected by that means.

BRIEF DESCRIPTION OF THE DRAWINGS

One example of implementation of the disclosure is illustrated in further detail in the following by means of the single diagram of FIG. 1, which depicts a device in accordance with the disclosure for the implementation of the process in accordance with the disclosure in a schematic depiction in a view from above.

DETAILED DESCRIPTION OF THE DISCLOSURE

The diagram of FIG. 1 depicts a device (1) in accordance with the disclosure for the handling of containers which, in one preferred example of implementation, is designed as part of a filling device for containers, and particularly as part of a filling device for flexible plastic bottles. The device (1) contains a rotating conveyor (2) in the form of a conventional carousel which is driven, in a rotating manner, in the direction of the arrow (A), whereby (A) determines the direction of transport of the rotating conveyor (2). A multiplicity of conveying stations (3) are provided on the rotating conveyor (2).

In the simplest case, a conveying station is only formed by a support surface or by a rotatable plate which is controlled, if necessary, for the free accommodation of a container. Upon higher rotational speeds of the carousel, a holding device for the containers is useful. The conveying stations (3) can then be provided with conventional gripping-or holding devices for containers (4) of the type known from the state of the art. A holding device can be designed as a selectively controlled raisable-or lowerable centering bell (not depicted), for example, for the axial clamping of a container between its head and base, whereby the centering bell is rotatable if a container is intended to be supported in a rotatable manner around its vertical axis.

Alternately, holding devices working with selectively controllable vacuum means, which engage with the base and/or the casing surface of containers, can be used.

Mechanically operating gripping clamps engaging with the rear or the neck of containers are particularly secure in operating terms. Suitable gripping clamps are described in detail in the patent documents DE 197 03 528 A1, EP 0 726 216 B1, EP 0 743 267 B1, EP 0 894 544 B1, or EP 1 009 710 B1. These gripping clamps are also particularly suitable for a base-free holding of containers.

The said conveying stations (3) are positioned distributed at uniform spacing distances (a) around the circumference of the rotating conveyor (2). An odd number of conveying stations (3) are preferably provided on the rotating conveyor (2).

The conveying stations (3) can, as depicted in FIG. 1, be designed for the accommodation of one container (4) each. In devices in which several containers are simultaneously transported or handled, as the case may be, the conveying stations (3) can also be designed for the accommodation of several containers (4), however.

The device (1) additionally contains an intake station (5) that contains an intake star wheel (6), which is driven in a rotating manner in the direction of the arrow (B), which defines its direction of transport. The circumferential speed of the intake star wheel (6) corresponds to the circumferential speed of the rotating conveyor (2) at the common contact point (7) at which the containers (4) of the intake star wheel (6) are transferred to the rotating conveyor (2), but the direction of rotation (A) is reversed, however. On the other hand, a multiplicity of conveying stations (8) for containers (4), which are positioned distributed at a uniform spacing distance (b) around the circumference of the intake star wheel (6), are provided on the intake star wheel (6). The conveying stations (8) preferably contain the same gripping-or holding devices, as the case may be, as the conveying stations (3), or else are compatible with the same, so that the containers (4) can be transferred without any problem at the transfer point (7) from the conveying stations (8) to the conveying stations (3). The spacing distance (b) between the conveying stations (8), however, amounts to twice the spacing distance (a) between the conveying stations (3). This double spacing distance (b) can be brought about either by means of a correspondingly expanded positioning of the conveying stations (8) on the intake star wheel (6), or by rendering the conveying stations positioned between the same inactive, or else by means of their gripping-or holding devices, as the case may be. In the example of implementation depicted, the intake star wheel (6) contains four conveying stations (8), but is not restricted to this number, however.

The intake station (5) additionally contains a separating device, such as a helical separating unit (9) of the known type, for example, which is not depicted in further detail here. The containers (4) arriving in succession are brought to the spacing distance (b) by means of the helical separating unit (9) in order to be handed over to the intake star wheel (6). If necessary, however, other transfer devices can be used in the intake station (5), or can be used as the intake station (5) for the discharge of a preceding handling device for the containers, if needed.

In the direction of transport (A) of the intake station (5), a discharge station (10) is provided spaced at a distance, which discharge station is, in the example of implementation depicted, designed as a discharge star wheel (12), which is preferably designed as the intake star wheel (6)—that is to say, it has conveying stations (13) at the spacing distance (b) and in the direction of the arrow (C), opposite to the direction of rotation (A)—but is driven at the same circumferential speed as the rotating conveyor (2), so that the containers (4) can be handed over, at one discharge point (14), from the rotating conveyor (2) to the discharge star wheel (12). The conveying stations (13) are, however, displaced relative to the conveying stations (8) of the intake station (5) by half a spacing distance (b) or by an entire spacing distance (a), as the case may be. The conveying stations (13) are preferably provided with the same holding or gripping devices as the rotating conveyor (2) or the intake star wheel (6), or are compatible with them. The discharge station (10) additionally contains a discharge conveyor (15), which transports the containers (4) away from the discharge star wheel (12).

The intake point (7) of the intake station (5) is positioned at a distance from the discharge point (14) of the discharge station (10), which distance, in the example of implementation depicted, corresponds to the sum of the separating sections of an odd number of conveying stations (3). The area between the intake point (7) and the discharge point (14) is designed as a section (16) for a multiple through-passage of the containers (4).

The example of implementation of the device (1) depicted brings about this multiple through-passage in a purely mechanical manner, solely through a suitable assessment of the transport distances.

The example of implementation depicted of the device (1) is operated as follows:

The containers (4) to be handled are, first of all, brought into the helical separating unit (9) of the intake station (5), are drawn apart on the large separating section (b) there, and are then brought to the conveying stations (8) of the intake star wheel (6), whereby all of the conveying stations (8) that are located at the spacing distance (b) are loaded with the containers (4). The containers (4) are transported in the direction of the arrow (B) to the intake point (7), and are handed over there to a free conveying station (3) of the carousel (2). Because of the double spacing distance (b) of the intake star wheel (6), only every second conveying station (3) of the carousel (2) is occupied.

The carousel (2) rotates in the direction of transport (A), in the direction of the discharge point (14). If the conveying station (3), which has just been loaded with the container (4) by the intake star wheel (6), reaches the discharge point (14), then it is ensured, by means of a suitable timing stroke or the passage control of the discharge star wheel (12), that no active conveying station (13) of the discharge star wheel (12) is located at the discharge point (14), or that no access to the passing container is provided, as the case may be. The container that has just been brought onto the carousel (2) consequently runs, first of all, past the discharge station (10), and reaches the area of the intake station (5) again. Because of the odd number of conveying stations (3) on the carousel (2), however, this container (4) reaches the intake point (7) at a time that no active conveying station (8) of the intake star wheel (6) is located there, or no new container is moved forward at the time, as the case may be, so that the container (4) can move smoothly past the intake point (7). This container (4) then reaches the section (16), and passes through it yet again. On the other hand, because of the odd number of conveying stations (3), or because of the selective activation of the holding elements on the carousel (2), as the case may be, this container then reaches the discharge point (14) if an active conveying station (13) of the discharge star wheel (12)

is located there, which conveying station can then take this over from the carousel (2) and pass it along to the conveyor (15).

In the meantime, the intake star wheel (6) continues to move forward in order to load every second conveying station (3) of the carousel (2), so that all conveying stations (3) in the section (16) are occupied, whereas, outside section (16), only every second conveying station (3) is occupied.

The example of implementation of the device (1) described can be modified in accordance with the purpose of application. In the example of implementation depicted, the device (1) is used for a leakage testing of filled and sealed containers. The intake star wheel (6) is thereby assigned to a filling and sealing device for the containers (4). Devices for exerting a predetermined pressure on the containers (4), preferably flexible plastic bottles, are assigned to the conveying stations (3) of the carousel (2), or the conveying stations (3) are directly designed as such, as the case may be. The intake point (7) and the discharge point (14) are, in this case, positioned as close to one another as possible, so that the section (16) is relatively short. An inspection system or a testing device (17), as the case may be, by means of which leakage-relevant parameters of the containers can be determined, is positioned in the section (16), so that a deformation of the containers (4) is preferably brought about through a persistent pressure on the containers (4). Through the closely adjacent positioning of the intake point (7) and the discharge point (14), which corresponds, in the example of implementation depicted, to the length of five adjacent conveying stations (3), the containers (4) are tested for the first time by the testing device (17) shortly after intake through the intake point (7). The containers (4) are tested a second time upon the second passage through the section (16)-that is to say, immediately before the second reaching of the discharge point (14), and immediately before the outward transfer by the discharge star wheel (12). Through the use of one and the same testing device (17) for both the reference-and the input measurement, as the case may be, and the actual measurement of the leakage, a high reproducibility of the measurement, or an inspection, as the case may be, is possible at low expense in terms of technical measurements.

The distance between the intake point (7) and the discharge point (14) amounts, for this purpose of use, to only a few conveying stations (3), and preferably less than half, and, in particular, less than a quarter of the circumference of the carousel (2). In the example of implementation depicted, the rotating conveyor (2) has a total of 17 conveying stations (3) and the section (16) corresponds to 5 conveying stations, so that each container (4), upon one complete passage, remains in the system or on the carousel (2), as the case may be, for 22 cycles, and thereby covers 22 times the distance of (a).

For other purposes of use, the distance between the intake point (7) and the discharge point (14)—that is to say, the length of the multiple section to be passed through (16)—can be expanded, such as if a sufficient time has to be made available, such as in order to allow a foam formation to die down, or in order to subject the containers to an inspection, or in order to carry out a different processing of containers, for example. The design in accordance with the disclosure consequently offers the possibility of inspecting a container over a longer distance (but otherwise with the same time) than is actually possible with the machine size (such as rotating and inspecting in the same carousel, for example).

Additional modifications of the device in accordance with the disclosure device are possible; thus, for example, the section (16) that is to be passed through multiple times can occupy approximately the entire distance of passage of the rotating conveyor (2), if the discharge station (10) is provided at the intake station (5) on the left side of the diagram. The number of the conveying stations can be changed and adjusted in accordance with need. The section (16) to be multiply passed through on the same conveying track can also be designed for three-fold passage, for example, whereby the mechanically controlled loading is brought about through the fact, for example, that only every third conveying station on the carousel is loaded and, when displaced by two conveying stations, only every third conveying station on the discharge station is emptied again. The intake-and the discharge station can be designed for loading and emptying in the same stroke if the intake point (7) and the discharge point (14) are located relative to one another at a distance corresponding to an even number of conveying stations (3). Finally, the displaced loading and emptying can also be ensured by means of technical control measures, even if at increased expense.

Thus, for example, intake-and discharge star wheels with controllable gripping elements, the spacing distance of which elements is in agreement with the spacing distance of the carousel, can be used, whereby each individual gripping element can, however, be selectively moved out of an opening position and into an access position by means of a control, and vice versa, through a precisely timed triggering of activation elements, such as pneumatic operating cylinders or the like. Reference is made in this connection to the state of the art known from the previous publications stated. The control of the passage of every individual container through the machine can be tracked by means of sensors, shift registers, and rotational position sensors on the carousel (positional tracking) and, depending on the desired number of passages on the carousel, the access or the release of the gripping-or holding elements on the star wheels and/or the carousel can be triggered in an individually time-and position-precise manner.

In order to drive the helical separating unit (9) through the control of the activatable drive, if needed, a step-or servomotor, for example, which only starts if a container is supposed to be moved forward to the intake star wheel (6), can be provided.

A multiple passage of a container on the carousel can also take place in connection with completely conventional intake-and discharge star wheels that have only accommodation pockets for the containers. The spacing distances can thereby be in agreement with those of the carousel. In that case, guide units extending to the carousel, which prevent a radial sliding away of the containers, are only to be provided on the radial external side of the star wheels. In the discharge area (14), a stationarily-positioned but individually triggerable shunting switch, or a short curved part, as the case may be, would then be provided on the radially internal side of the conveying stations (3) of the carousel, which switch can be swiveled into the conveying track of a container (4) in the direction of the discharge star wheel (12) within a short time if the container has the necessary number of passages behind it, and should be guided away from the discharge star wheel.

I claim:

1. A process for the handling of containers, comprising handing over the containers to an intake station on a rotating conveyor, conveyed by the rotating conveyor first to a discharge station and again to the intake station, past the discharge station and, no sooner than upon a second reaching of the discharge station, removing the containers from the rotating conveyor, and wherein one section in the direction of transport between the intake station and the discharge station is passed through multiple times.

2. A process in accordance with claim 1, wherein the section is passed through two times, and that, upon every passage of the rotating conveyor in the intake station, only every second conveying station on the rotating conveyor is occupied, and, in the discharge station, only every second conveying station, displaced by one conveying station relative to the intake station, is emptied.

3. A process in accordance with claim 1, further comprising carrying out a processing of the container in the section multiply passed through, between the intake station and the discharge station.

4. A process in accordance with claim 3, wherein the processing of the same container is carried out upon every passage through the multiple through-passage section.

5. A process in accordance with claim 1, wherein the section multiply passed through is shorter than half the rotating section of the rotating conveyor, and that the containers only pass through this shorter section after the intake.

* * * * *

UNITED STATES PATENT AND TRADEMARK OFFICE
CERTIFICATE OF CORRECTION

PATENT NO. : 7,565,961 B2  Page 1 of 1
APPLICATION NO. : 10/544137
DATED : July 28, 2009
INVENTOR(S) : Rudolf Fiegler It is certified that error appears in the above-identified patent and that said Letters Patent is hereby corrected as shown below:

On the Title Page:

Item (30), "103 55 183" should be -- 10355183.2 --.

Signed and Sealed this

Sixteenth Day of March, 2010

David J. Kappos
*Director of the United States Patent and Trademark Office*